United States Patent [19]

Coté et al.

[11] Patent Number: 4,899,858
[45] Date of Patent: Feb. 13, 1990

[54] METHOD AND CONTROL SYSTEM FOR UPDATING OF CONTROL PARAMETER VALUE INDICATIVE OF MASTER CLUTCH POINT OF INCIPIENT ENGAGEMENT

[75] Inventors: William F. Coté, Farmington Hills; Donald Speranza, Portage, both of Mich.

[73] Assignee: Eaton Corporation, Cleveland, Ohio

[21] Appl. No.: 318,100

[22] Filed: Mar. 2, 1989

[51] Int. Cl.⁴ .................... B60K 41/02; B60K 41/28
[52] U.S. Cl. ............................. 192/0.09; 192/0.044; 192/0.092; 192/111 A
[58] Field of Search ................. 192/0.09, 0.044, 0.046, 192/0.092, 0.094, 111 A, 103 F, 103 R

[56] References Cited

U.S. PATENT DOCUMENTS 4,413,714  11/1983  Windsor ........................ 192/103 R
4,732,246   3/1988  Tateno et al. ..................... 74/872

Primary Examiner—Rodney H. Bonck
Assistant Examiner—Andrea Pitts
Attorney, Agent, or Firm—H. D. Gordon

[57] ABSTRACT

An improved automatic clutch control system for controlling a vehicle master clutch (16) drivingly interposed a throttle controlled engine (14) and a change gear transmission (12) in an automatic/semi-automatic mechanical transmission system (AMT) is provided. A monitored clutch parameter (CPV) is compared to a reference value (IEPCPV) to determine the expected point of incipient engagement of the clutch. The reference value is periodically updated, to compensate for wear and the like.

10 Claims, 3 Drawing Sheets

METHOD AND CONTROL SYSTEM FOR UPDATING OF CONTROL PARAMETER VALUE INDICATIVE OF MASTER CLUTCH POINT OF INCIPIENT ENGAGEMENT

BACKGROUND OF THE INVENTION

1. Field of the Invention

The present invention relates to clutch controls for automatically controlling the engagement and disengagement of transmission system master clutches and in particular relates to clutch controls for master clutches utilized with automatic/semi-automatic mechanical transmission systems. More particularly, the present invention relates to an improved automatic clutch control method and system, typically having a modulated engagement mode wherein the master friction clutch is moved rapidly from the fully disengaged position to the position of almost incipient, or about incipient, engagement and then fully engaged in a modulated manner and wherein the position of almost incipient or incipient engagement is determined by the value of a monitored clutch parameter, which value is periodically updated usually in a vehicle start-up routine, to adjust value of the parameter for wear, adjustments or the like.

2. Description of the Prior Art

The use of automatic and/or semi-automatic transmissions of both the automatic mechanical type utilizing positive clutches and of the planetary gear type utilizing frictional clutches is well known in the prior art, as are control systems therefor. Electronic control systems utilizing discrete logic circuits and/or software controlled microprocessors for automatic transmissions wherein gear selection, shift execution and/or shift decisions are made based upon certain measured and/or calculated parameters such as the presence of a transmission gear neutral condition, vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semi-automatic transmission control systems for vehicles may be seen by reference to U.S. Pat. Nos. 4,722,248; 4,722,237; 4,676,115; 4,648,290; 4,595,986; 4,361,060; 4,551,802; 4,527,447; 4,425,620; 4,463,427; 4,081,065; 4,073,203; 4,253,348; 4,038,889; 4,226,295; 3,776,048; 4,208,929; 4,029,061 3,974,720; 3,478,851; 3,942,393 and 4,595,986, the disclosures of which are all hereby incorporated by reference.

The automatic controls for the master clutches thereof are known in the prior art as may be seen by reference to U.S. Pat. Nos. 3,478,851; 3,752,284; 4,019,614; 4,038,889; 4,081,065; 4,361,061 and 4,401,200, the disclosures of which are hereby incorporated by reference.

Referring specifically to the automatic clutch control, in a vehicle equipped with an automatic/semiautomatic mechanical transmission, during normal operation, when starting from at rest or operating at a very low speed, the master friction clutch is modulated between fully disengaged and fully engaged conditions, i.e. is partially engaged, according to certain input parameters, to maintain the engine speed at a set value above idle speed and/or to achieve smooth starts. Typically, the set engine speed value is throttle position modulated to provide appropriate starting torque and the clutch is moved toward engagement and disengagement, respectively, as the engine speed increases above and falls below, respectively, the set engine speed value.

In another system, see above mentioned U.S. Pat. No. 4,081,065, the clutch is modulated in accordance with throttle position, engine speed and engine acceleration.

While the above automatic mechanical transmission systems are considered to be highly advantageous, they are not totally satisfactory as, in a modulated engagement mode, such as during a start from stop operation, the engagement of the clutch was modulated for its entire travel from fully disengaged to fully engaged condition rather than moving quickly to almost the incipient engaged condition and then modulating to full engagement and/or did not periodically measure and update the incipient engagement point to adjust for wear, out of adjustment conditions and the like and/or sensed the occurence of actual incipient engagement and thus could not cease rapid engagement until some period of time after incipient engagement occured. The term "incipient engagement" of the master clutch refers to the clutch condition wherein the friction surfaces are almost or just at the point of contact.

Movement of the clutch actuators from the fully disengaged to the incipient engagement position in any manner other than the fastest possible manner is undesirable as control of the system, i.e., control of engine and/or input shaft speed, by varying amount of clutch engagement (i.e. slip) is not possible during this portion of actuator movement and delays in achieving at least incipient engagement make closed loop control of the system more difficult. This is especially true as movement from the fully disengaged condition to incipient engagement may require up to about fifty percent (50%) of the total actuator disengagement and up to about thirty five percent (35%) of the full actuator supply pressure.

Failure to periodically monitor and update the point of incipient engagement, as determined by a monitored clutch actuator parameter such as actuator pressure and/or a lever position, is undesirable as wear of the friction surfaces and/or mechanical actuator members, misadjustments of the mechanical members, manual or automatic adjustments and the like, can cause a relatively large variance of the value of the control parameter corresponding to incipient engagement. By way of example only, in a typical automatic transmission system utilizing a fluid pressure applied, spring released clutch actuator mechanism, about 60 psig actuator pressure is required to fully engage the clutch and about 25 psig actuator pressure is required to reach the point of incipient engagement. It has been found that the pressure to reach incipient engagement may vary by as much as five or six psig during operation of the system before manual adjustment of the clutch is required.

An automatic clutch control system including means to move the controlled friction clutch from the fully disengaged condition towards the fully engaged condition as rapidly as possible, until sensing actual initial engagement of the clutch friction linings, is disclosed in above-mentioned U.S. Pat. No. 4,401,200. While this prior art system is an improvement over the previously existing systems, this system is not totally satisfactory as actual initial clutch engagement must occur and be sensed to initiate a change from the most rapid to a modulated engagement mode of operation and thus, due to sensing and change in mode of operation delays, the rapid clutch engagement is not limited to the free travel take-up only. Also a value of a monitored clutch actuator parameter, such as actuator pressure and/or lever position, corresponding to expected initial or incipient engagement is not set. Such a value, in addition to permitting most rapid clutch engagement to occur only until just prior to expected incipient engagement, provides a parameter which can be updated and compared to previously determined values to sense system damage and/or operating errors.

U.S. Pat. No. 4,646,891, the disclosure of which is hereby incorporated by reference, discloses a clutch control system for sensing the value of a monitored parameter, such as actuator pressure, corresponding to the master clutch incipient engagement point by monitoring the value of another parameter, such as engine speed, which will change in a predictable manner upon master clutch incipient engagement.

While this system is effective, it is not a vehicle start-up routine, but requires vehicle running down road conditions, it is an indirect form of calibration and may be occasionally exposed to values of the other parameter which change for reasons not related to master clutch incipient engagement and/or does not utilize an averaging technique to filter the current control parameter to sense trends but not minor variations in external circumstances.

SUMMARY OF THE INVENTION

In accordance with the present invention, the drawbacks of prior art have been overcome or minimized by the provision of an automatic master friction clutch control method and system, preferably for use in an automatic/semi-automatic mechanical transmission system, which typically has a modulated engagement mode of operation wherein the clutch actuators cause the clutch to move rapidly to the position of incipient, or preferably almost incipient, engagement and then move the clutch to a fully engaged position in a modulated manner in accordance with sensed, stored and/or calculated inputs and predetermined logic rules, wherein the point of expected incipient engagement is determined by the value of a monitored clutch parameter and is updated periodically to compensate for wear and the like.

The value of the monitored parameter corresponding to master clutch incipient engagement is updated during a start-up routine in a manner wherein the point of incipient engagement is determined in a positive manner and, preferably, the value is calculated by a "rolling average" technique to filter out extraneous effects and the like.

The above is accomplished by a method/system wherein upon a vehicle start-up, i.e., a cold start, the system checks at predetermined intervals, such as 10 millisecond intervals, that the vehicle is stopped and the transmission is in neutral. If at any time either of these conditions is not true then the master clutch incipient engagement point update procedure aborts and normal transmission processing proceeds. If both conditions are true, the system validates the stored value for the incipient engagement point (this is done by comparing the stored value with predefined limits, if the current value is outside the limits then it is initialized to a default value that approximates the correct point), awaits for the engine to be running at idle speed and for adequate air pressure to be present in the vehicle air system. When these conditions are valid, throttle control is temporarily taken away from the driver and the following test is run.

The master clutch is fully disengaged and the input shaft of the transmission is brought to a stop by applying the input shaft brake. Next, air is slowly applied to the clutch actuator (causing the clutch to move towards the engaged position) until the input shaft is observed to turn against the resistance of the brake. When movement of the shaft is first detected, the current clutch position is noted, the clutch is disengaged, the inertia brake is released, and throttle control is returned to the driver.

The noted master clutch position (or other monitored clutch control parameter) is where the master clutch produces approximately 75 lb-ft of torque (this is the amount of torque the input shaft brake is capable of generating and is therefore the amount of clutch torque required to overcome the brake). The desired point of incipient engagement is where the clutch produces approximately 10 lb-ft of torque, making the point found an upper bound on the incipient engagement point. Experimental results have shown that the actual incipient engagement point of the clutch can be closely approximated simply by subtracting a relatively small constant offset from the point where the shaft began to turn. This calculation produces a snapshot of the clutch incipient engagement point at that instant in time.

The instantaneous clutch incipient engagement point varies somewhat due to clutch and flywheel temperature and atmospheric conditions. In order to filter out extraneous effects that could cause the system to perform differently each time the vehicle is started an averaging technique is used. The old value for the clutch incipient engagement point is multiplied by N, a positive number such as 15, added to the determined point and then divided by N+1, 16. This produces a low pass filter that weights new information only 1/15th as highly as the old information. This insures that long term wear trends are taken into account without the system responding erratically due to minor variations in external circumstances.

By storing the updated value of a clutch parameter, the clutch may then be caused to assume almost the expected incipient condition in a rapid unmodulated manner without overshooting the point of incipient engagement.

Accordingly, it is an object of the present invention to provide an automatic clutch control method and system, preferably for an automatic or semi-automatic mechanical transmission system, wherein the control has a modulated engagement mode wherein the clutch is caused to move rapidly in an unmodulated manner from the fully disengaged to almost the incipient engagement position, and wherein the reference value of the control parameter utilized as an indication of the incipient engagement position of the clutch is periodically updated to compensate for wear and the like.

This and other objects and advantages of the present invention will become apparent from a reading of the detailed description of the preferred embodiment taken in connection with the attached drawings.

DESCRIPTION OF THE PREFERRED EMBODIMENT

Figure 1:
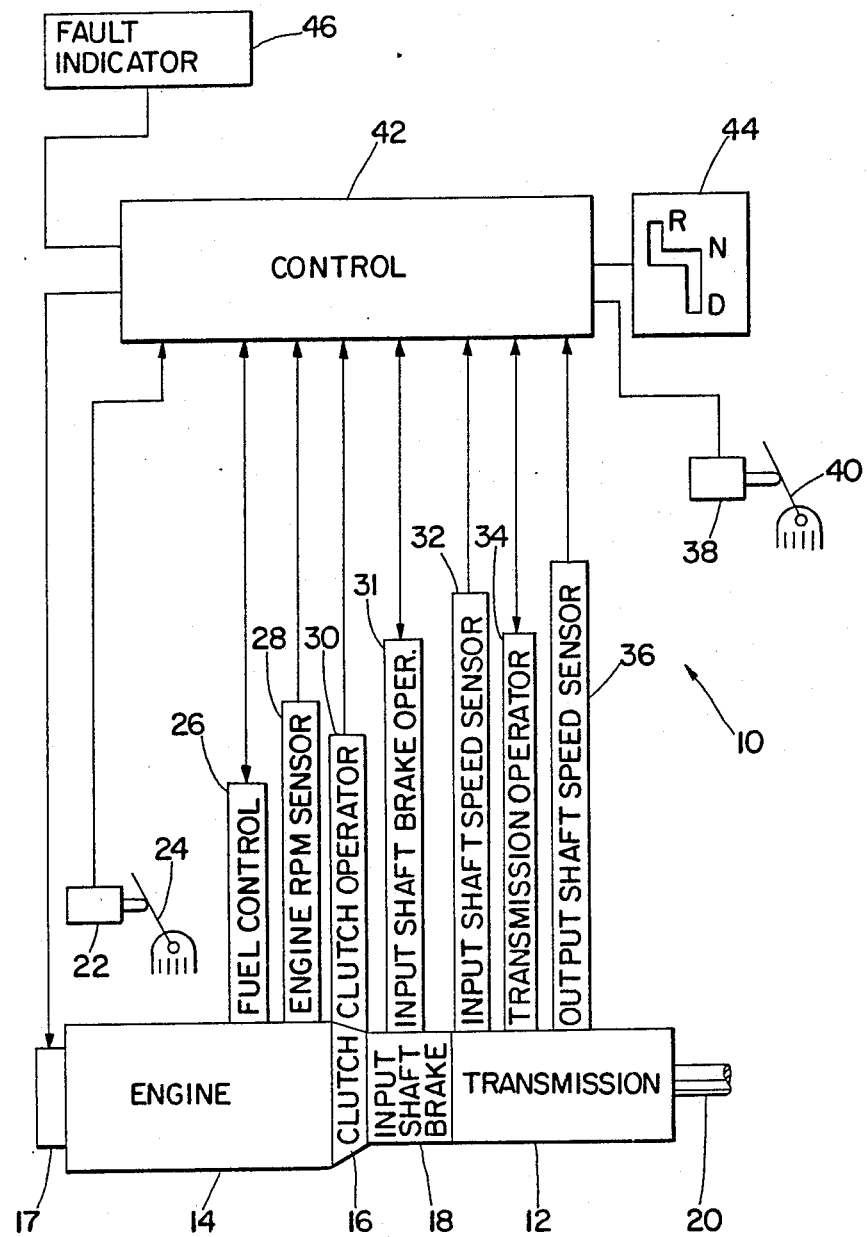
FIG. 1 is a schematic illustration of an automatic mechanical transmission control system of the type advantageously utilizing the automatic clutch control system of the present invention.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

FIG. 1 schematically illustrates an automatic mechanical transmission system 10 including an automatic multi-speed compound change gear transmission 12 driven by a throttle controlled engine 14, such as a well known diesel engine, through a friction master clutch 16. An engine brake, such as an exhaust brake 17 for retarding the rotational speed of engine 14 and an input shaft brake 18 which is effective to apply a retarding force to the input shaft upon disengagement of master clutch 16 are provided as is known in the prior art. The output of automatic transmission 12 is output shaft 20 which is adapted for driving connection to an appropriate vehicle component such as the differential of a drive axle, a transfer case or the like as is well known in the prior art.

The above-mentioned power train components are acted upon and/or monitored by several devices. These devices include a throttle position or throttle opening monitor controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of the gear neutral condition and/or currently engaged ratio, and a transmission output shaft speed sensor 36. A vehicle brake monitor 38 senses actuation of vehicle brake pedal 40.

A transmission operator for an automatic/semi-automatic mechanical transmission system may be seen by reference to U.S. Pat. No. 4,445,393, the disclosure of which is hereby incorporated by reference. The above-mentioned devices supply information to and/or accept commands from a central processing unit or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above-mentioned U.S. Pat. Nos. 4,445,393; 4,361,060; 3,776,048, 4,038,889; 4,226,295; 4,702,127 and 4,722,237.

Sensors 22, 28, 32, 36, 38 and 44 may be of any known type of construction for generating analogue or digital signals proportional to the parameter monitored thereby. Similarly, operators 17, 18, 26, 30 and 34 may be of any known electrical, hydraulic, pneumatic or electropneumatic type for executing operations in response to command signals from processing unit 42 and/or for providing input signals thereto. Fuel control 26 will normally supply fuel to engine 14 in accordance with the operator's setting of throttle 24 but may supply a lesser (fuel dip) or greater (fuel boost) amount of fuel in accordance with commands from control unit 42..

As is known, the purpose of the central processing unit 42 is to select, in accordance with a program, the optimal gear ratio at which the transmission should be operating and if necessary to command a gear change, or shift, into the selected optimal gear ratio based upon the current and/or stored information. The commands comprise commands to the transmission operator 34 to engage a desired gear ratio, to throttle control 26 to control the speed of the engine and to clutch operator 30 for proper operation of master clutch 16.

Figure 2:
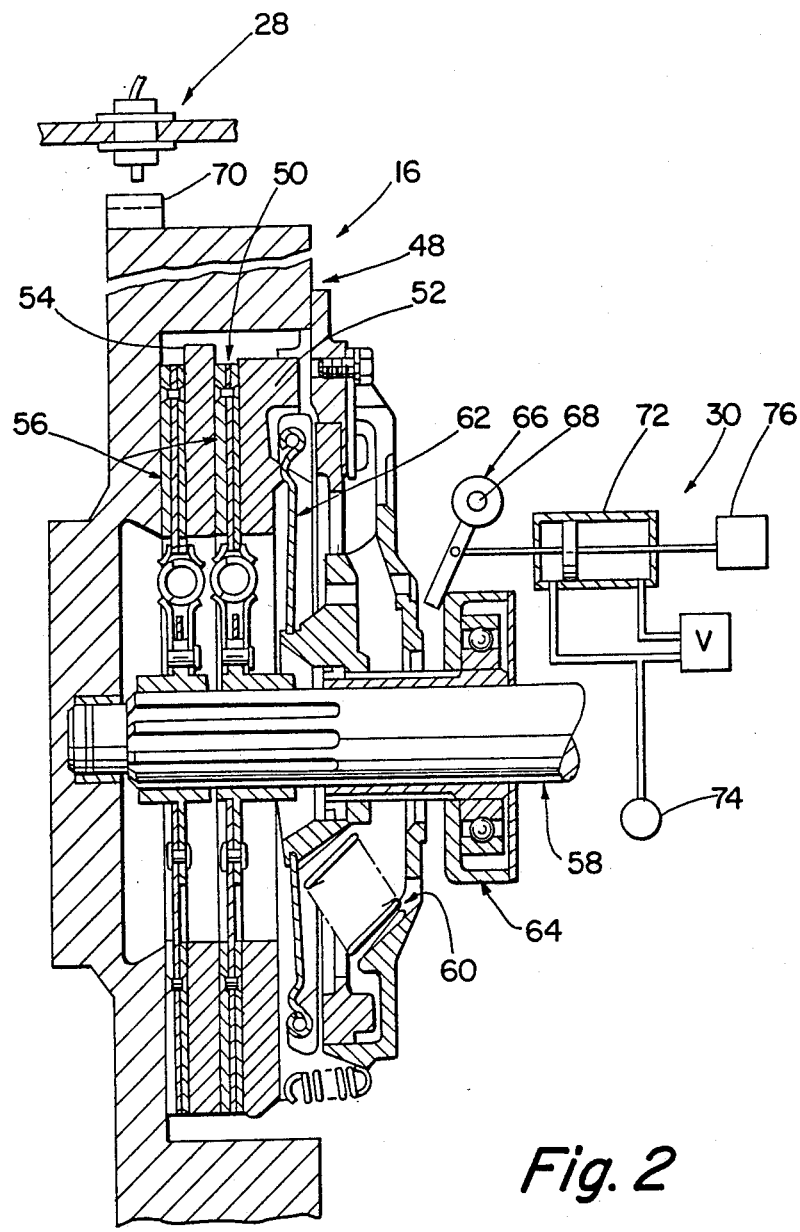
FIG. 2 is a cross sectional view of a typical master friction clutch of the type automatically controlled by the present invention.

A typical master friction clutch 16 of the type to be automatically controlled by the automatic clutch control system of the present invention may be seen by reference to FIG. 2. It is understood, of course, that the specific construction of the clutch and actuator therefore are shown for illustrative purposes and that the control system of the present invention is suitable for use in connection with clutches and/or operators therefor of differing structure. Clutch 16 illustrated is a typical two plate mechanical spring applied clutch which is mounted to an engine flywheel 48. Internal lugs 50 on the inner radius of the fly wheel 48 correspond to slots in the clutch pressure plate 52 and intermediate plate 54 causing these elements to rotate at engine speed. They are, however, free to move in an axial direction. Clutch driven discs 56 are splined to the transmission input shaft 58. Clutch torque is provided by engaging springs 60 acting through levers 62 to apply a pressure to pressure plate 52. This pressure squeezes the driven discs 56 and intermediate plate 54 between the pressure plate 52 and intermediate plate 54. The magnitude of the clutch torque is proportional to this pressure.

The force provided by the spring 60 on the pressure plate 52 can be controlled by the axial position of the throw out bearing assembly 64. Throw out bearing assembly 64 can be moved in the axial direction by a control lever 66 mounted on a shaft 68. The shaft 68 is mounted in a clutch housing such that pivotal movement of the clutch control lever 66 will cause an axial movement of the throw out bearing assembly 64. In this manner, movement of control lever 66 can vary the force on pressure plate 52 and therefore the available clutch torque. A magnetic pickup 28 is mounted in the clutch housing and detects tooth passage of the gear teeth 70 located on the outer radius of the engine flywheel 48 to provide a signal proportional to engine speed.

Pivotal movement of the control lever 66 is controlled by a piston, cylinder and control valve assembly 72. Lever 66 and assembly 72 comprise the clutch actuator 30. Control valve V may, as disclosed in above-mentioned U.S. Pat. Nos. 4,081,065 and 4,361,060 comprise fine and course ports for modulated and rapid movement of lever 66. A sensor 74 for sensing clutch actuator pressure and/or a sensor 76 for sensing lever/piston position may be provided for providing input signals to CPU 42.

The automatic clutch control system of the present invention, when utilized in connection with an automatic mechanical transmission system, comprises a portion of the central processing unit 42. As indicated above, the clutch control system of the present invention may be separate and distinct from any transmission control devices. The central processing unit may utilize discrete logic components or a programmed (by means of software and/or firmware) microprocessor. If a microprocessor is utilized, the discrete logic components/circuits, such as comparators, etc., are replaced by algorithm routines, etc., as is known in the prior art.

The automatic clutch control system of the present invention is provided to automatically control the master friction clutch 16 connecting an engine 14 to a mechanical change gear transmission 12. Change gear transmissions are well known in the prior art and an example thereof may be seen by reference to U.S. Pat. No. 3,105,395, the disclosure of which is hereby incorporated by reference. The automatic clutch control system of the present invention controls operation of the clutch to engage and disengage same in accordance with certain current and/or stored parameters and logic rules. The automatic clutch control system preferably, will be similar to the clutch control systems illustrated and described in above-mentioned U.S. Pat. Nos. 4,401,200; 4,361,060; 4,081,065 and 3,752,284.

The automatic clutch control will typically have several modes of operation, namely, a start from stop mode of operation wherein the clutch is engaged in a modulated manner and several gear change modes of operation when a vehicle transmission is shifted with the vehicle moving at above a given rate of speed. Typically, in the gear shift mode of operation, the master clutch is automatically caused to fully disengage at the initiation of a gear shift operation and automatically caused to fully re-engage at the completion of a gear shift operation at a rate of travel and/or slip which may be modulated or unmodulated. A considerably greater degree of control, as is well known in the prior art, is required for operation of the clutch in the start from stop mode of operation.

Typically, in the start from stop mode of operation, the master clutch must be modulated between a fully disengaged and a fully engaged condition, or maintained at a predetermined partially engaged condition, in accordance with certain parameters which usually include at least engine speed and throttle position, to achieve an acceptably smooth start without stalling of the vehicle engine. During a start from stop operation, the clutch is often maintained in a variably partially engaged condition, i.e. allowed a predetermined amount of slip, to maintain the engine speed and/or engine acceleration at above a predetermined value, which value is typically determined by engine idle speed and throttle position. Typically, the predetermined value is proportional to sensed throttle position expressed as a percentage of wide open throttle.

In the gear shift modes of operation, if the drive line is engaged, the clutch is typically engaged in a modulated manner to achieve smooth engagement. During a downshift, when the clutch is engaged with the drive line disengaged to utilize the engine to increase the input shaft speed to a synchronous speed for the transmission gear ratio being engaged (i.e. similar to the manual transmission double clutch operation), the clutch is typically engaged in a rapid, unmodulated manner.

In the modulated modes of clutch engagement, especially in the start from stop mode of operation, the clutch 16 is utilized as an essential control element of the automatic/semi-automatic mechanical transmission system. As the clutch 16 can exercise no control over the system during that portion of engagement when it moves from the fully disengaged to the incipient engagement position, it is highly desirable to move the clutch as rapidly as possible between these positions during a modulated clutch engagement operation and to then control the degree of engagement of the clutch in a modulated manner, according to sensed, calculated and/or stored inputs and logic rules from the incipient engagement to fully engaged conditions thereof. As the sensing of actual incipient engagement of the clutch, and switching the actuator from the rapid unmodulated to the modulated modes of operation requires a period of time, it is highly desirable to have an accurate means to predict the conditions at which incipient engagement will occur, and to switch the actuator from the rapid unmodulated to the modulated mode of operation just prior to the occurence of the predicted condition. To achieve the above, the control must have an accurate means to determine the clutch condition corresponding to the clutch incipient engagement condition.

Typically, to determine the point of master clutch incipient engagement, the value of a control parameter, such as the reading from position sensor 76 or pressure sensor 74, corresponding to clutch incipient engagement is utilized.

As the illustrated system utilizes a standard design dry or wet clutch to couple the transmission to the engine, during shifts and upon vehicle starts it is desirable for the control computer 42 to know the location of the clutch incipient engagement point. Since this point changes over time due to clutch wear and adjustment, it is advantageous for the system to have a means of determining it dynamically, i.e. to update the incipient engagement point control parameter value ("IEPCPV").

Figure 3:
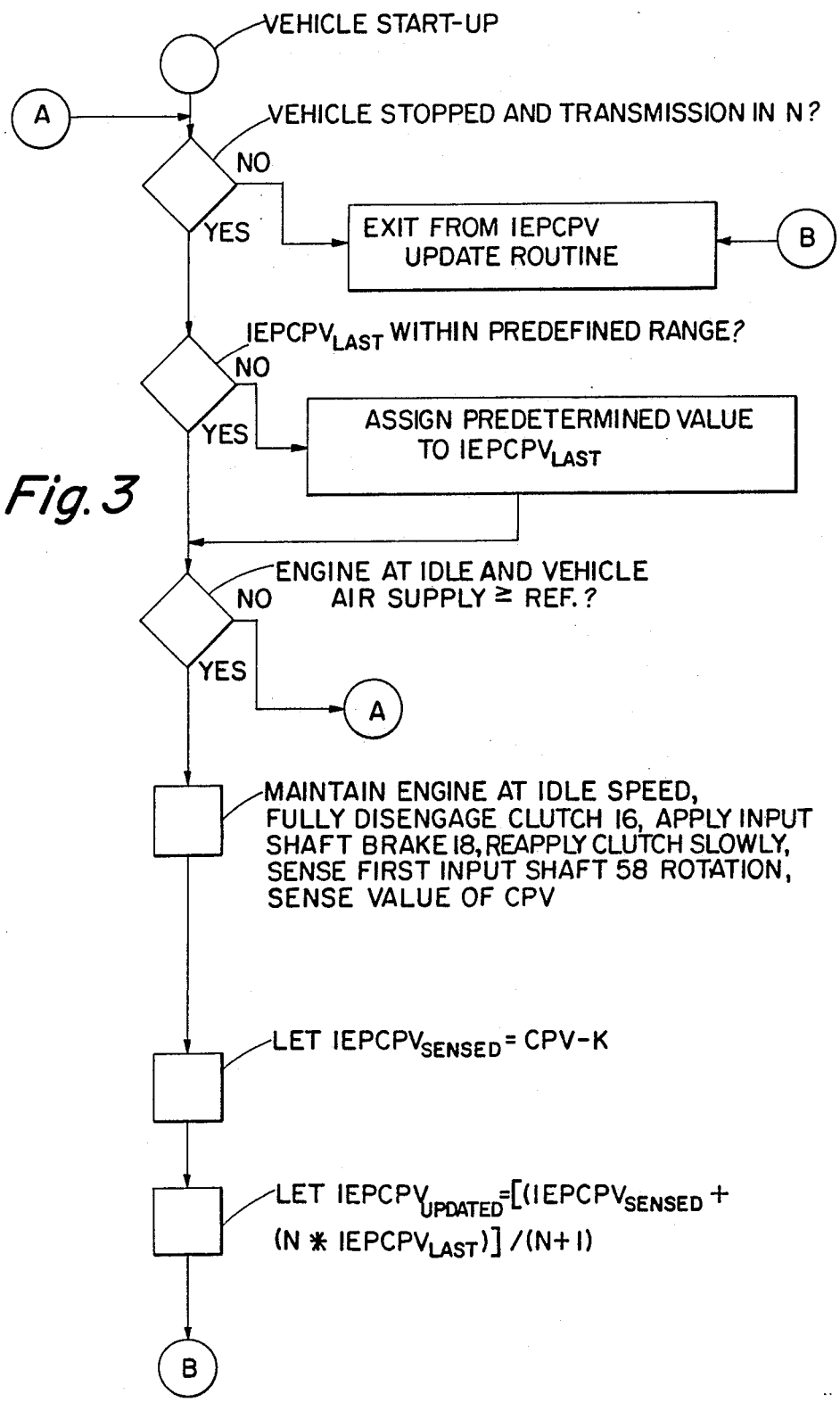
FIG. 3 is a symbolic illustration, in the form of a flow chart, illustrating a preferred method of practicing the present invention.

The method utilized to update the IEPCPV is schematically illustrated in FIG. 3.

Upon a cold start-up of the vehicle, the system checks at predetermined (10 millisecond) intervals that the vehicle is stopped and the transmission is in neutral. If at any time either of these conditions is not true then the IEPCPV update procedure aborts and normal transmission processing proceeds. If both conditions are true the system validates the stored value for the IEPCPV (this is done by comparing the stored value with predefined limits, if the current value is outside the limits then it is initialized to a default value that approximates the correct IEPCPV, waits for the engine to be running at idle speed and for adequate air pressure to be present in the vehicle air system. When these conditions are valid, throttle control is temporarily taken away from the driver and the following test or procedure is run.

The master clutch 16 is fully disengaged and the input shaft 58 of the transmission is brought to a stop by applying the input shaft brake 18. Next, air is slowly applied to the clutch actuator 30 (causing the clutch to move towards the engaged position) until the input shaft is observed (sensor 32) to turn against the resistance of the input brake. When movement of the shaft is first detected, the sensed value of the control parameter is noted, the clutch is disengaged, the inertia brake is released, and throttle control is returned to the driver.

The noted clutch position is where the clutch produces approximately 75 lb-ft of torque (this is the amount of torque the input shaft brake is capable of generating and is therefore the amount of clutch torque required to overcome the brake). The desired point of incipient engagement is where the clutch produces approximately 10 lb-ft of torque, making the point found an upper bound on the low pressure point. Experimental results have shown that the actual point of the clutch can be closely approximated simply by subtracting a relatively small constant offset "K" from the point where the shaft began to turn. This calculation produces a snapshot of the IEPCPV at that instant in time.

The instantaneous clutch incipient engagement point varies somewhat due to clutch and flywheel temperature and atmospheric conditions. In order to filter out extraneous effects that could cause the system to perform differently each time the vehicle is started an averaging technique is used. The old value for the IEPCPV (IEPCPV$_{Last}$) is multiplied by N (for example 15), added to the determined point "IEPC$_{sensed}$" and then divided by N+1(i.e. 16). This produces a low pass filter that weighs new information only 1/15th as highly as the old information. This insures that long term wear trends are taken into account with the system responding erratically due to minor variations in external circumstances.

Accordingly, as may be seen, an automatic clutch control system, preferably for use in connection with a vehicle equipped with an automatic/semi-automatic mechanical transmission system, is provided which includes logic for engaging the clutch in a modulated manner including moving the clutch from the fully disengaged to the incipient engagement position rapidly and then fully engaging the clutch in a modulated manner. The point of incipient, or preferably almost incipient, clutch engagement is achieved by commanding the clutch actuator to assume a condition wherein one or more of the monitored/controlled parameters is caused to assume a value (IEPCPV$_{Last}$) corresponding to incipient, or preferably almost incipient, clutch engagement, which value is periodically updated in a positive manner.

Although the present invention has been set forth with a certain degree of particularity, it is understood that various modification and substitution and rearrangement of the components are possible without departing from the spirit and the scope of the invention as hereinafter claimed.

We claim:

1. A method for controlling a master clutch (16) in an at least partially automated mechanical transmission system (10) for devices having a throttle controlled engine (14), a transmission having a plurality of gear ratio combinations selectively engageable between a transmission input shaft (58) and a transmission output shaft (20), said transmission input shaft being operatively connected to said engine by means of a selectably engageable and disengageable coupling (16) providing driving connection between said engine and said input shaft, an input shaft brake (18) for selectively retarding the rotational movement of said input shaft, said transmission system comprising an information processing unit (42) having means for receiving and storing a plurality of input signals including (1) an input signal (CPV) indicative of the position of the clutch; (2) an input signal indicative of the rotational speed of the transmission input shaft; and, (3) an input signal indicative of the rotational speed of the engine, said input signal indicative of the position of the clutch having a stored value (IEPCPV$_{Last}$) indicative of the incipient engagement point of the clutch, said processing unit including means for processing said input signals in accordance with predetermined logic rules and for generating output signals whereby said transmission system is operated in accordance with said program, and means (30,34) associated with said transmission system effective to actuate said transmission system in response to said output signals from said processing unit, the method characterized by:

updating the value of the control parameter value indicative of the incipient engagement of the clutch (IEPCPV$_{Last}$) by,
   at vehicle start-up, if the engine is at idle speed and the transmission is in neutral, maintaining the engine at substantially idle speed, fully disengaging the clutch and applying the input shaft brake to stop rotational speed of the input shaft,
   then, while maintaining the input shaft brake applied, gradually reapplying the clutch until initial rotation of the input shaft is sensed, and
   sensing the value of the signal indicative of the position of the clutch (CPV) at the time initial rotation of the input shaft is sensed.

2. The method of claim 1 wherein said clutch transfers less torque at the point of incipient engagement than the torque applied to said input shaft by said input shaft brake, and the difference in the value of the signal indicative of the position of the clutch at the point of incipient engagement and at the point wherein the torque transferred by the clutch is sufficient to cause the input shaft to rotate over the retarding force of the input shaft brake is approximately of predetermined magnitude (K) whereby the current sensed value of the control parameter indicative of the incipient engagement of the clutch equals the sensed value of the signal indicative of the position of the clutch minus said predetermined magnitude (IEPCPV$_{sensed}$=CPV-K).

3. The method of claim 2 wherein said control parameter value indicative of the incipient engagement of the clutch is updated by an averaging technique wherein IEPCPV updated=a function of [(IEPCPV sensed)+(-N*IEPCPV$_{last}$)]/(N+1) wherein:

| | | |
|---|---|---|
| IEPCPU$_{sensed}$ | = | the value of the input signal indicative of clutch position at incipient engagement sensed in the updating routine; |
| IEPCPU$_{last}$ | = | the last stored value of the input signal indicative of clutch position at incipient engagement; and |
| N | = | a positive number greater |

4. The method of claim 3 wherein, prior to calculating the updated value of the control parameter indicative of incipient engagement of said clutch ($\text{IEPCPU}_{updated}$), said last stored value of the control parameter indicative of incipient engagement ($\text{IEPCPU}_{last}$) is compared to a preset range, and if not within said range, an estimated predetermined value of said parameter is substituted for the stored value thereof.

5. The method of claim 1 wherein said control system has at least one mode of operation for causing said clutch to assume said fully engaged condition in a modulated manner in accordance with said input signals and predetermined logic rules, said one mode including causing said actuator to manipulate said clutch from the fully disengaged to about the incipient engagement position thereof in a nonmodulated rapid manner and then manipulate said clutch from the incipient engagement position to the fully engaged condition in a modulated manner.

6. A control system for controlling a master clutch (16) in an at least partially automated mechanical transmission system (10) for devices having a throttle-controlled engine (14), a transmission having a plurality of gear ratio combinations selectively engageable between a transmission input shaft (58) and a transmission output shaft (20), said transmission input shaft being operatively connected to said engine by means of a selectably engageable and disengageable coupling (16) providing driving connection between said engine and said input shaft, an input shaft brake (18) for selectively retarding the rotational movement of said input shaft, said transmission system comprising an information processing unit (42) having means for receiving and storing a plurality of input signals including (1) an input signal (CPV) indicative of the position of the clutch; (2) an input signal indicative of the rotational speed of the transmission input shaft; and (3) an input signal indicative of the rotational speed of the engine, said input signal indicative of the position of the clutch having a stored value ($\text{IEPCPV}_{last}$) indicative of the incipient engagement point of the clutch, said process unit including means for processing said input signals in accordance with predetermined logic rules and for generating output signals whereby said transmission system is operated in accordance with said program, and means (30,34) associated with said transmission system effective to actuate said transmission system to effect engagement of said gear ratio combinations in response to said output signals from said processing unit, the control system characterized by:
means effective for updating the value of the control parameter value indicative of the incipient engagement of the clutch ($\text{IEPCPV}_{last}$) by,
at vehicle start-up, if the engine is at idle speed and the transmission is in neutral, maintaining the engine at substantially idle speed, fully disengaging the clutch and applying the input shaft brake to stop rotational speed of the input shaft,
then, while maintaining the input shaft brake applied, gradually reapplying the clutch until initial rotation of the input shaft is sensed, and
sensing the value of the signal indicative of the position of the clutch (CPV) at the time initial rotation of the input shaft is sensed.

7. The control system of claim 6 wherein said clutch transfers less torque at the point of incipient engagement than the torque applied to said input shaft by said input shaft brake, and the difference in the value of the signal indicative of the position of the clutch at the point of incipient engagement and at the point wherein the torque transferred by the clutch is sufficient to cause the input shaft to rotate over the retarding force of the input shaft brake is of approximately predetermined magnitude (K) whereby the current sensed value of the control parameter indicative of the incipient engagement of the clutch equals the sensed value of the signal indicative of the position of the clutch minus said predetermined magnitude ($\text{IEPCPV}_{sensed} = \text{CPV} - k$).

8. The control system of claim 7 wherein said control parameter value indicative of the incipient engagement of the clutch is updated by an averaging technique wherein $\text{IEPCPV}_{updated} =$ a function of $[(\text{IEPCPV sensed}) + (N * \text{IEPCPV}_{last})]/(N+1)$ wherein:

| | | |
|---|---|---|
| $\text{IEPCPU}_{sensed}$ | = | the value of the input signal indicative of clutch position at incipient engagement sensed in the updating routine; |
| $\text{IEPCPU}_{last}$ | = | the last stored value of the input signal indicative of clutch position at incipient engagement; and |
| N | = | a positive number greater than one. |

9. The method of claim 8 wherein, prior to calculating the updated value of the control parameter indicative of incipient engagement of said clutch ($\text{IEPCPU}_{updated}$), said last stored value of the control parameter indicative of incipient engagement ($\text{IEPCPU}_{last}$) is compared to a preset range, and if not within said range, an estimated predetermined value of said parameter is substituted for the stored value thereof.

10. The method of claim 1 wherein said control system has at least one mode of operation for causing said clutch to assume said fully engaged condition in a modulated manner in accordance with said input signals and predetermined logic rules, said one mode including causing said actuator to manipulate said clutch from the fully disengaged to about the incipient engagement position thereof in a nonmodulated rapid manner and then manipulate said clutch from the incipient engagement position to the fully engaged condition in a modulated manner.

* * * * *